July 25, 1933.     C. W. McKINLEY     1,919,475
REAR VISION MIRROR
Filed June 29, 1932
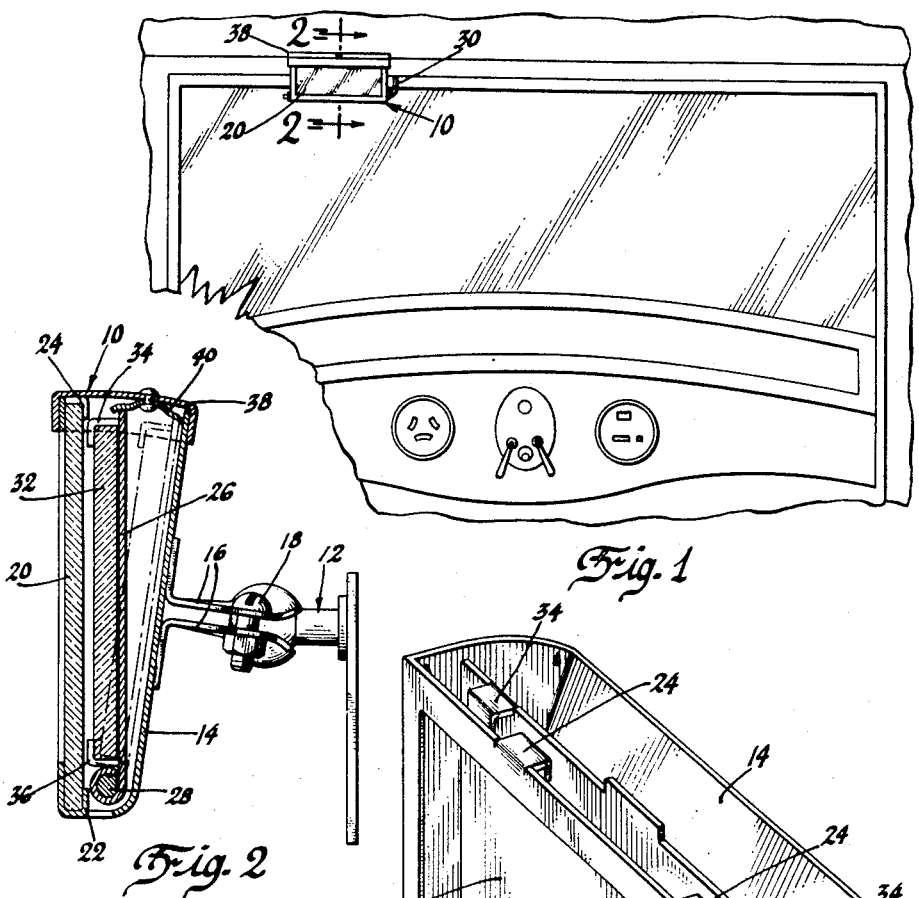
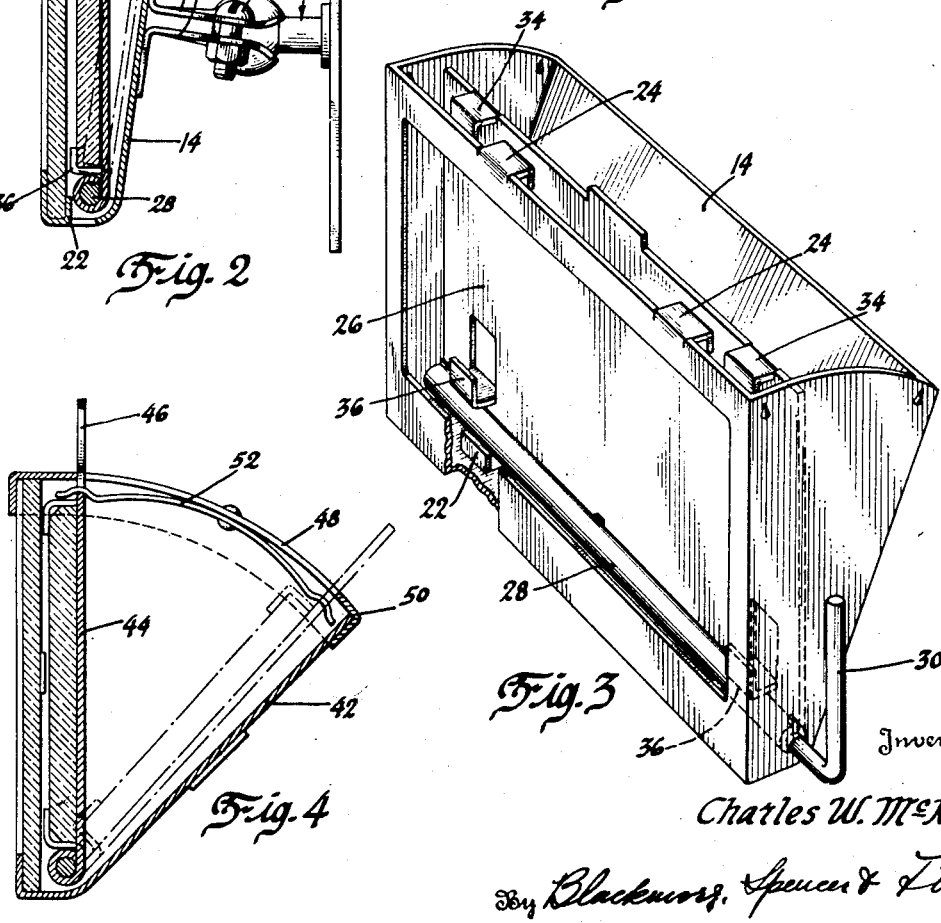
Inventor
Charles W. McKinley Patented July 25, 1933

1,919,475

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

REAR VISION MIRROR

Application filed June 29, 1932. Serial No. 619,823.

This invention has to do with rear view mirrors such as are used in automobiles and particularly the type that provides a choice of a reflecting surface of high efficiency or a reflecting surface of low efficiency such as is disclosed and claimed in the prior application of Robert N. Falge, S. N. 396,830, filed October 2, 1929.

My mirror is distinguished from previous designs in that the mirror assembly is not tilted to change from one kind of reflection to the other, but includes as an element a shiftable mirror which alone need be moved to make the change.

In the drawing:

Figure 1 is a fragmentary view of a portion of the interior of an automobile showing the mirror in position.

Figure 2 is a section on line 2—2 of Figure 1.

Figure 3 is a perspective view of the construction with the mirror removed.

Figure 4 is a view corresponding to Figure 2 showing a modified construction.

I have indicated the mirror assembly as a whole by the reference character 10. This assembly may be adjustably mounted above the windshield in accordance with current practice. I have illustrated a bracket 12 in the form of a ball headed stud secured to the car body, and I have shown the housing or support 14 for the mirror assembly provided with a pair of rearwardly extending clips 16 having sockets fitting the ball on the stud 12. Fastening bolts 18 may be used as shown to clamp the sockets about the bolt. By this means the mirror assembly may be tilted up or down, or sidewise to fit the arrangement of seats and location of rear window and the convenience of the driver. The mirror assembly consists of a housing or support 14 preferably of V-shape in cross section as shown. This part may be in the form of a complete housing or may simply be a skeleton framework. It may be formed of stamped sheet metal. Within the open front of the housing is secured a transparent plate 20 held in position by bent-over lugs 22 and 24 integral with the housing. Within the housing is a holder 26 pivotally mounted within the V by means of pintle 28 to which it is rigidly secured. The pintle 28 is pivoted in the ends of the housing and may be provided with an upturned operating handle 30. A mirror 32 is secured to the holder by means of pressed out clips 34 and 36. The top of the housing is provided with a removable cover 38 to the underside of which is secured a spring clip 40 provided with seats to engage the edge of the holder 26 in its extreme positions.

For daytime use the mirror 32 is arranged in the position shown in Figure 2. Here the full power reflection from the silvered back of the mirror 32 gives good vision. For night driving the mirror 32 is moved to the dotted line position so that the image from the silvered back is reflected above the driver's line of vision, and he receives only the reflection from the front and rear surfaces of the glass 20, these practically coinciding to give a single image. The reflecting efficiency of the glass 20 is about 5% compared with 95% efficiency for the mirror 32. The low efficiency reflection from the glass 20 will be found entirely satisfactory for night driving, and much better than the conventional mirror for the reason that the intense blinding light from the headlights of the following cars will be eliminated. The handle 30 provides a convenient operating means, while the clip 40 holds the mirror 32 in its desired position of adjustment.

The construction shown in Figure 4 is substantially the same as that shown in Figure 2, except that the housing 42 is of greater angle and the mirror holder 44 is provided with a handle 46 projecting through slot 48 formed in the top 50 of the housing. To the underside of the top 50 is secured the spring clip 52 functioning as before.

I claim:

1. In a rear view mirror the combination of a housing having an open front, a transparent cover for the front of the housing providing a reflector of low efficiency for use in night driving, a mirror adjustably mounted in the housing at the rear of the cover, said mirror being shiftable into reflecting position at said open front to provide a reflector of high efficiency for use in daytime driving.

2. In a rear view mirror the combination of a housing having an open front, a transparent cover for the front of the housing providing a reflector of low efficiency for use in night driving, a mirror adjustably mounted in the housing at the rear of the cover, said mirror being shiftable into reflecting position at said open front to provide a reflector of high efficiency for use in daytime driving, and means for adjustably mounting the housing on a suitable support.

3. In a rear view mirror the combination of a housing having an open front, a transparent cover for the front of the housing providing a reflector of low efficiency for use in night driving, a mirror tiltably mounted within the housing at the rear of the cover, said mirror being tiltable into reflecting position parallel to said cover to provide a high efficiency reflector for use in day driving.

4. In a rear view mirror the combination of a housing substantially V-shaped in cross section having an open front, a transparent cover for said front, a mirror in said housing at the rear of said cover, said mirror being fulcrumed at the bottom of the V and movable from a position in parallel with said cover to a position inclined with respect thereto.

5. In a rear view mirror the combination of a housing substantially V-shaped in cross section having an open front, a transparent cover for said front, a mirror in said housing at the rear of said cover, said mirror being fulcrumed at the bottom of the V and movable from a position in parallel with said cover to a position inclined with respect thereto, and means for yieldingly holding the mirror in either of its adjusted positions.

6. In a rear view mirror the combination of a housing substantially V-shaped in cross section having an open front, a transparent cover for said front, a mirror in said housing at the rear of said cover, said mirror being fulcrumed at the bottom of the V and movable from a position in parallel with said cover to a position inclined with respect thereto, and an operating member for the mirror extending outside of the housing.

CHARLES W. McKINLEY.